Patented Nov. 15, 1938

2,136,871

UNITED STATES PATENT OFFICE 2,136,871

LUMINESCENT ZINC COMPOUNDS

Alfred Wakenhut, Seelze, near Hanover, Germany, assignor to J. D. Riedel-E de Haen A. G., Berlin-Britz, Germany No Drawing. Application April 2, 1936, Serial No. 72,337. In Germany July 27, 1933

12 Claims. (Cl. 134—47)

My invention relates to luminescent compositions and more especially to compositions consisting of a combination of zinc compounds possessing particularly valuable properties.

It is an object of my invention to provide means whereby a luminescent zinc composition of greater efficiency can be produced than similar compositions hitherto on the market.

As is well known to those skilled in the art, luminescent zinc sulfide has been produced for years in a great number of different ways. In view of the fact that chemically pure zinc sulfide is not luminescent and that traces of a metal other than zinc and capable of activating the composition for luminescence, must be present in the zinc sulfide in order to render it luminescent, processes were discovered which provided the means for producing a luminescent sulfide.

Unfortunately the luminescence, induced by the action of light, of zinc sulfide, while being initially very marked, greatly diminishes after a short time and for this reason the luminescent zinc sulfide hitherto available has not been found suitable for many purposes. At the present time its use is almost exclusively limited to the production of radioactive luminous paints which are distinguished from the luminous paints containing alkaline earth compounds by a great resistivity against atmospheric and other chemical influences.

I have now found that it is possible to produce a zinc sulfide possessing an extraordinary extended and very bright phosphorescence, which term is intended to include phosphorescence induced by natural and artificial light, by calcining zinc sulfide within a range of temperatures ranging from about 900° C. to about 1200° C., in the presence of other zinc compounds, more especially such containing oxygen, in such manner that the calcined product contains a predetermined, relatively low percentage of an oxygen compound of zinc such as ZnO, the term "relatively low percentage" being intended to designate a percentage of the order of magnitude of, or a range of approximately, 2–3% by weight of the zinc sulfide present in the composition. I may add to the zinc sulfide either zinc oxide or hydroxide or carbonate, taking care to add only compounds of great purity as far as phosphorescence is concerned.

Preferably about 2% of an oxygen compound of zinc such as ZnO shall be admixed to the ZnS constituting the bulk of the final composition.

The zinc composition thus obtained is distinguished from ordinary zinc sulfide also in other respects. The most conspicuous distinction is the far more intensive yellow tint of the phosphorescent luminosity, as compared with the well known green shade of luminescent zinc sulfide, which is the product ordinarily sold on the market.

The new product according to the present invention can also be activated with radioactive substances. The permanent phosphorescence excited by alpha-rays is accompanied in a very favorable manner by a subsequent, particularly persistent phosphorescence, provided that the paint has been allowed to accumulate light during daytime. In this latter case a good practical effect can be obtained with a less strongly activated and therefore less expensive paint. In many cases, for instance in the case of alarm clocks, crucifixes, luminous signboards, labels, ribbons, etc., the expensive radium or mesothorium may even be dispensed with altogether.

In view of the superiority of the new zinc sulfide compound the luminous paints containing alkaline earth metal compounds, which, although being comparatively unstable, were hitherto considered indispensable in view of their extended phosphorescence, may now be replaced by the far more stable zinc sulfide.

In practicing my invention I may for instance proceed as follows:

*Example 1.*—1 kilogram zinc sulfide is mixed with 50 grams NaCl that quantity of an alcoholic solution of $CuCl_2.H_2O$ which corresponds to about 0.1 gram Cu and 20 grams ZnO. The intimate mixture is subjected to calcination at 1200° C. during 2 hours. The calcined product is then treated as usual for the production of a marketable product.

*Example 2.*—In the mixture of Example 1 the 20 grams ZnO are replaced by 30 grams $ZnCO_3$ and the calcination is carried through 2 hours at 1100° C.

*Example 3.*—In the mixture of Example 1 the 20 grams ZnO are replaced by 25 grams $Zn(OH)_2$ and the mixture is calcined 2 hours at 1000° C.

*Example 4.*—In the mixture of Example 1 the 20 grams ZnO are replaced by 25 grams $Zn(OH)_2$ and the mixture is calcined 3 hours at 900° C.

In all these cases the chemical substances introduced into the mixture must be pure from the viewpoint of phosphoresence chemistry.

Various changes may be made in the details disclosed in the foregoing specification without departing from the invention or sacrificing the advantages thereof.

I claim:
1. The process of producing a phosphorescent composition comprising admixing with zinc sulfide a minute quantity of a heavy metal compound, capable of activating the composition for luminescence, and a relatively low percentage of a zinc compound containing oxygen and convertible into ZnO by heating, and subjecting the mixture to calcination within a range of temperatures extending from the neighborhood of 900° C. to about 1200° C.

2. The process of claim 1, in which the quantity of an oxygen compound of zinc corresponds to about 2% ZnO calculated on the ZnS present.

3. The process of claim 1, in which about 2% by weight ZnO is admixed with the zinc sulfide.

4. The process of claim 1, in which about 2.5% by weight $Zn(OH)_2$ is admixed with the zinc sulfide.

5. The process of claim 1, in which about 3% by weight $ZnCO_3$ is admixed with the zinc sulfide.

6. The process of producing a phosphorescent composition comprising admixing with pure zinc sulfide about 5% by weight NaCl, a quantity of a copper compound capable of activating the composition for luminescence corresponding to about 0.01% by weight Cu and about 2% of a compound selected from the group of zinc compounds consisting of ZnO, $Zn(OH)_2$ and $ZnCO_3$ and subjecting the mixture to calcination within a range of temperatures extending from the neighbourhood of 900° C. to about 1200° C.

7. The process of claim 1, in which the heavy metal compound is a copper compound in a quantity corresponding to about 0.01% Cu of the mixture.

8. The process of claim 1, in which also an alkali metal halide is admixed with the zinc sulfide before calcination.

9. The process of claim 1, in which also NaCl is admixed with the zinc sulfide before calcination.

10. As a new product a phosphorescent composition consisting of zinc sulfide, a relatively low percentage of ZnO, and a minute quantity of a heavy metal compound capable of activating the composition for luminescence.

11. As a new product a phosphorescent composition consisting of zinc sulfide, about 2% ZnO, and a minute quantity of a heavy metal compound capable of activating the composition for luminescence.

12. As a new product a phosphorescent composition consisting of zinc sulfide, a relatively low percentage of ZnO, and a minute quantity of a copper compound capable of activating the composition for luminescence.

ALFRED WAKENHUT.